(12) United States Patent
LiPiShan et al.

(10) Patent No.: US 11,981,802 B2
(45) Date of Patent: May 14, 2024

(54) ETHYLENE/ALPHA-OLEFIN/POLYENE BASED COMPOSITIONS

(71) Applicant: Dow Global Technologies LLC, Midland, MI (US)

(72) Inventors: Colin LiPiShan, Pearland, TX (US); Juan C. Tuberquia, Manvel, TX (US); Guang Ming Li, Sugar Land, TX (US); Timothy E. Clayfield, Cham (CH); Lena T. Nguyen, Lake Jackson, TX (US); Edward O. Madenjian, Lake Jackson, TX (US); Cory M. Thomas West, Houston, TX (US); Alexandra E. Frankel, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 35 days.

(21) Appl. No.: 16/314,291

(22) PCT Filed: Jun. 29, 2017

(86) PCT No.: PCT/US2017/040081
§ 371 (c)(1),
(2) Date: Dec. 28, 2018

(87) PCT Pub. No.: WO2018/005852
PCT Pub. Date: Jan. 4, 2018

(65) Prior Publication Data
US 2021/0230414 A1    Jul. 29, 2021

Related U.S. Application Data

(60) Provisional application No. 62/356,949, filed on Jun. 30, 2016.

(51) Int. Cl.
*C08L 23/16* (2006.01)

(52) U.S. Cl.
CPC ......... *C08L 23/16* (2013.01); *C08L 2205/025* (2013.01); *C08L 2207/07* (2013.01)

(58) Field of Classification Search
CPC .... C08F 210/18; C08F 4/64193; C08F 2/001; C08F 210/06; C08F 236/20; C08F 2500/17; C08F 2500/25
See application file for complete search history.

(56) References Cited

U.S. PATENT DOCUMENTS 5,468,550 A    11/1995    Davis et al.
5,610,254 A    3/1997    Sagane et al.
(Continued)

FOREIGN PATENT DOCUMENTS

EP    0718324    6/1996
EP    0751182    1/1997
(Continued)

OTHER PUBLICATIONS

PCT/US217/040081, International Search Report and Written Opinion dated Aug. 31, 2017.
(Continued)

*Primary Examiner* — Mark S Kaucher

(57) ABSTRACT

The invention provides a composition comprising a first composition, comprising a first ethylene/alpha-olefin/non-conjugated polyene and a second ethylene ethylene/alpha-olefin/non-conjugated polyene, and wherein the first composition comprises the following property: Mw>1389.6 [g/mole] MV+115,000 g/mole, wherein MV is the Mooney Viscosity (ML 1+4, 125 C), and Mw N is the weight average molecular weight, as determined by conventional GPC.

9 Claims, 3 Drawing Sheets

(56) References Cited

U.S. PATENT DOCUMENTS

| | | | |
|---|---|---|---|
| 5,691,413 | A | 11/1997 | Morikawa et al. |
| 5,902,867 | A | 5/1999 | Muskens et al. |
| 5,985,970 | A | 11/1999 | Chodha et al. |
| 8,178,031 | B2 | 5/2012 | Jacob et al. |
| 10,450,394 | B2 | 10/2019 | Fontaine et al. |
| 2006/0183631 | A1 | 8/2006 | Lee et al. |
| 2009/0209672 | A1 | 8/2009 | Ebata et al. |
| 2011/0233448 | A1 | 9/2011 | Ebata et al. |
| 2012/0116021 | A1 | 5/2012 | Liang et al. |
| 2013/0031611 | A1 | 1/2013 | Barreto |
| 2016/0122520 | A1 | 5/2016 | Jung et al. |
| 2019/0055422 | A1 | 2/2019 | Brennan et al. |
| 2019/0136030 | A1 | 5/2019 | Han et al. |

FOREIGN PATENT DOCUMENTS

| | | |
|---|---|---|
| EP | 1433812 | 6/2004 |
| JP | 2004035813 | 2/2004 |
| JP | 04132672 | 8/2008 |
| WO | 00/26268 | 5/2000 |
| WO | 2006/009976 | 1/2006 |
| WO | 2007/136494 | 11/2007 |
| WO | 11/008837 | 1/2011 |
| WO | 2011041230 | 4/2011 |
| WO | 2011/065877 | 6/2011 |
| WO | 2011/163176 | 12/2011 |
| WO | 2012/027448 | 3/2012 |
| WO | 2012/092491 | 7/2012 |
| WO | 2013/096573 | 6/2013 |
| WO | 2014/084893 | 6/2014 |

OTHER PUBLICATIONS

PCT/US2017/040081, International Preliminary Report on Patentability dated Jan. 1, 2019.

ETHYLENE/ALPHA-OLEFIN/POLYENE BASED COMPOSITIONS

REFERENCE TO RELATED APPLICATIONS

This application claims the benefit of U.S. Provisional Application 62/356,949 filed Jun. 30, 2016, and incorporated herein by reference.

BACKGROUND OF THE INVENTION

There is a need for new compositions containing ethylene/alpha-olefin/non-conjugated polyene interpolymers that can be used for vulcanized rubber compositions, and provide improved mixing and processibility, improved mechanical properties, and improved product consistency. One of the variables used to tailor the rheological behavior of polymer molecules is via the introduction of long chain branches (LCB) that have comparable length to that of the backbone. The more of these branches are introduced into the backbone (typically estimated by GPC), the higher the viscosity at low shear rates (V0.1) and shear thinning behavior exhibited by the polymer (RR). Catalyst technology used today to make EPDM introduces long chain branches at a certain degree and has traditionally coupled high molecular weight polymers with high viscosities at low shear rates. However, there is a need for ethylene/alpha-olefin/nonconjugated polyene interpolymers that have a combination of low viscosities at high shear rates, expected from linear molecules, with the inherent tendency of catalysts to introduce branching, for improved rheology and mechanical properties.

WO 2007/136494 disclosed ethylene/alpha-olefin/diene polymers prepared from a catalyst composition comprising a zirconium complex of a polyvalent aryloxyether. WO 2006/009976 discloses processes for preparing polyolefins in the presence of a perfluoro-carbon or hydrofluorocarbon with an activated, nonmetallocene, metal-centered, heteroaryl ligand catalyst. Polymers and compositions are also disclosed in the following: WO2012/027448, WO2013/096573, WO2014/084893, WO2011/008837, WO2012/092491, US20060183631, WO2011/163176, EP1433812A1, WO2011/041230, WO2006/009976, WO2000/26268, U.S. Pat. No. 8,178,031, EP751182A1, EP718324A1, WO2011/0065877, US2013/031611, JP04132672B2 (abstract), JP2004035813 (abstract), EP1433812A1, and PCT/US16/020212 (filed Mar. 1, 2016). However, as discussed above, there is a need for ethylene/alpha-olefin/nonconjugated polyene interpolymers that have a combination of low viscosities at high shear rates, expected from linear molecules, with the inherent tendency of catalysts to introduce branching, to provide improved mixing and processibility and improved mechanical properties, and improved product consistency. This need has been met by the following invention.

SUMMARY OF THE INVENTION

A composition comprising a first composition, comprising a first ethylene/alpha-olefin/non-conjugated polyene and a second ethylene ethylene/alpha-olefin/non-conjugated polyene, and wherein the first composition comprises the following property: Mw>1389.6 [g/mole] MV+115,000 g/mole, wherein MV is the Mooney Viscosity (ML 1+4, 125° C.), and Mw is the weight average molecular weight, as determined by conventional GPC.

DETAILED DESCRIPTION OF THE INVENTION

Figure 1:
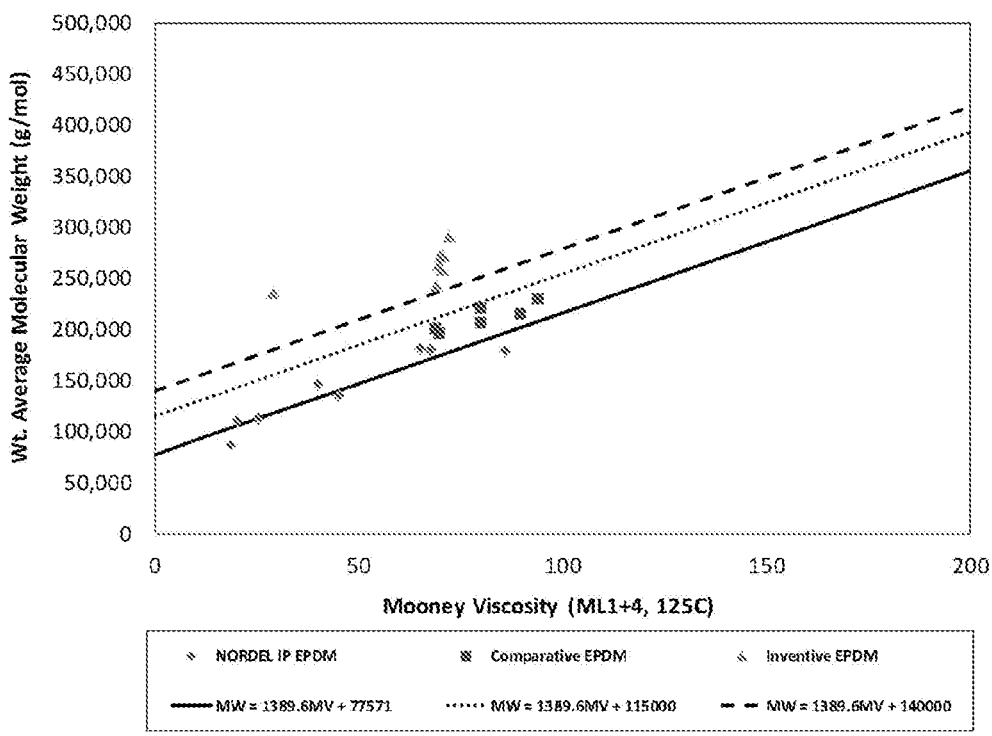
FIG. 1 depicts several "Mw versus MV" plots, and this relationship for several inventive and comparative first compositions.
Figure 2:
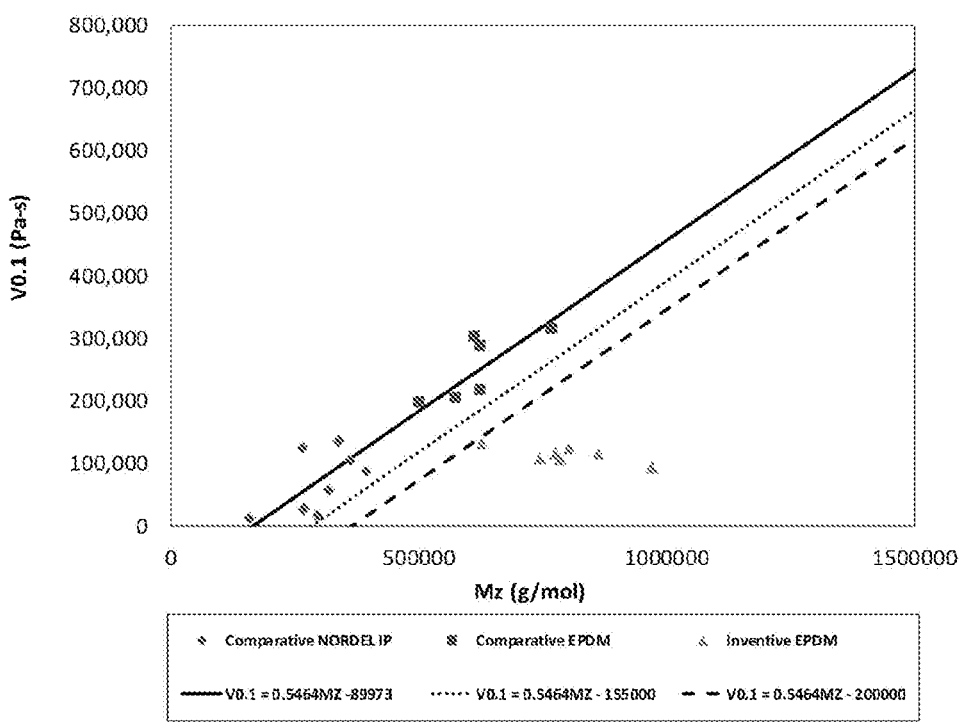
FIG. 2 depicts several "V0.1 versus MZ" plots, and this relationship for several inventive and comparative first compositions.

It has been discovered a new polymer architecture using the concept of intermediate chain branching (iCB) in which oligomers produced in situ are rapidly incorporated into the polymer backbone. The branches resulting from incorporation of these oligomers do not increase the viscosity at low shear rates and therefore the resultant polymer exhibit similar behavior to that of linear molecules. Plus, incorporation is highly efficient such that oligomer content is undetectable in the final polymer. It has been discovered that iCB in the inventive polymers. In the case of the iCB polymers reported here, the combination of high density of branches (estimated by NMR) and their intermediate length (30 to 75 carbon units) extend the backbone chain length required for entanglement in the molten state. This behavior is virtually similar to that of linear molecules.

As discussed above, the invention provides a composition comprising a first composition, comprising a first ethylene/alpha-olefin/non-conjugated polyene and a second ethylene ethylene/alpha-olefin/non-conjugated polyene, and wherein the first composition comprises the following property: Mw>1389.6 [g/mole] MV+115,000 g/mole, wherein MV is the Mooney Viscosity (ML 1+4, 125° C.), and Mw is the weight average molecular weight, as determined by conventional GPC. The Mooney Viscosity (ML 1+4, 125° C.) is that of the first composition without filler and without oil.

The inventive composition may comprise a combination of two or more embodiments described herein.

The first composition may comprise a combination of two or more embodiments described herein.

The first ethylene/alpha-olefin/nonconjugated polyene interpolymer may comprise a combination of two or more embodiments described herein. The second ethylene/alpha-olefin/nonconjugated polyene interpolymer may comprise a combination of two or more embodiments described herein.

In one embodiment, the first composition further comprises the following property: Mw≥1389.6 [g/mole] MV+140,000 g/mole, wherein MV is the Mooney Viscosity (ML 1+4, 125° C.), and Mw is the weight average molecular weight, as determined by conventional GPC. The Mooney Viscosity (ML 1+4, 125° C.) is that of the first composition without filler and without oil.

In one embodiment, the first composition further comprises the following property: V0.1<0.5464 [(Pa·s)(mole/g) Mz−155,000 Pa·s, wherein V0.1 is the melt viscosity (0.1 rad/s, 190° C.), and Mz is the z average molecular weight, as determined by conventional GPC. The V0.1 value is that of the first composition without filler and without oil.

In one embodiment, the first composition further comprises the following property: V0.1≤0.5464 [(Pa·s)(mole/g) Mz−200,000 Pa·s, wherein V0.1 is the melt viscosity (0.1 rad/s, 190° C.), and Mz is the z average molecular weight, as determined by conventional GPC. The V0.1 value is that of the first composition without filler and without oil.

In one embodiment, the first composition has a "13C NMR % iCB Peak Area," which is the {[(13C NMR peak area from 34.4 ppm to 34.6 ppm) divided by (the 13C NMR sum integral area from 0.00 ppm to 60.0 ppm and from 160.0 ppm to 100.0 ppm)]×100}, that is >0.010%, or >0.020%, or >0.030%, or >0.040%, or >0.050%, or >0.060%, or >0.070%, or >0.080%, or >0.090%, as determined by 13C NMR, described herein.

In one embodiment, the first composition has a "13C NMR iCBI value >0.03, or >0.06, or >0.07, or >0.08, or >0.09, or >0.10, or >0.11, or >0.12 or >0.13, or >0.14, or >0.15, or >0.16, or >0.17, or >0.18, or >0.19, or >0.20 as determined by 13C NMR, described herein.

In one embodiment, the first composition has a "13C NMR % iCB Peak Area," which is the {[(13C NMR peak area from 34.4 ppm to 34.6 ppm) divided by (the 13C NMR sum integral area from 0.00 ppm to 60.0 ppm and from 160.0 ppm to 100.0 ppm)]×100}, that is ≥0.100%, or ≥0.150%, or ≥0.200%, or ≥0.250%, or ≥0.300%, or ≥0.350%, or ≥0.400%, or ≥0.450%, or ≥0.500%, as determined by 13C NMR, described herein.

In one embodiment, the first composition has a "13C NMR iCBI value ≥0.30, or ≥0.40, or ≥0.50, or ≥0.60, or ≥0.70, or ≥0.80, or ≥0.90, or ≥1.00, as determined by 13C NMR, described herein.

In one embodiment, the first composition has a "13C NMR % Peak Area," which is the {[(13C NMR peak area from 21.3 ppm to 22.4 ppm) divided by (total integral area from 19.5 ppm to 22.4 ppm)]×100}, that is ≥3.5%, or ≥4.0%, or ≥5.0%, or ≥6.0%, or ≥7.0%, or ≥8.0%, or ≥9.0%, or ≥10.0%, or ≥11.0%, or ≥12.0%, or ≥13.0%, or ≥14.0%, or ≥15.0%, as determined by 13C NMR, described herein.

In one embodiment, the first composition has a Mooney Viscosity from 25 to 100, or from 30 to 100, or from 40 to 100 (ML 1+4, 125° C.). The Mooney Viscosity (ML 1+4, 125° C.) is that of the first composition without filler and without oil.

In one embodiment, the first composition has a MWD from 2.80 to 6.80, or from 2.80 to 5.80, or from 2.80 to 4.80, or from 2.80 to 3.80.

In one embodiment, the first composition has a weight average molecular weight Mw from 200,000 to 500,000 g/mole. In one embodiment, the first composition has a weight average molecular weight (Mw) from 210,000 to 450,000 g/mole, further from 220,000 to 400,000 g/mole, further from 220,000 to 350,000 g/mole.

In one embodiment, the first composition has a tan delta (0.1 rad/s, 190° C.) from 1.20 to 2.50, or from 1.30 to 2.40, or from 1.40 to 2.30. The tan delta value is that of the first composition without filler and without oil.

In one embodiment, the first ethylene/alpha-olefin/non-conjugated polyene is an EPDM, and the second ethylene ethylene/alpha-olefin/non-conjugated polyene is an EPDM.

In one embodiment, the first composition has a viscosity at 0.1 rad/sec, 190° C., from 90,000 Pa·s to 150,000 Pa·s, or from 92,000 to 145,000 Pa·s, or from 92,000 to 140,000 Pa·s, or from 92,000 to 135,000 Pa·s. The V0.1 value is that of the first composition without filler and without oil.

In one embodiment, the first composition has a rheology ratio (V0.1/V100 at 190° C.) from 20 to 60, or from 25 to 55. The V0.1/V100 value is that of the first composition without filler and without oil.

In one embodiment, the first composition comprises from 80 to 99 wt %, or from 85 to 99 wt %, or from 90 to 99 wt %, or from 95 to 99 wt %, or from 98 to 99 wt % of the sum of the first and the second interpolymers, based on the weight of first composition. In one embodiment, the first composition comprises from 20 to 55 wt %, or from 20 to 50 wt %, or from 20 to 45 wt %, or from 20 to 40 wt %, or from 20 to 35 wt % of the first interpolymer, based on sum weight of the first and second interpolymer.

In one embodiment, the composition comprises from 80 to 99 wt %, or from 85 to 99 wt %, or from 90 to 99 wt %, or from 95 to 99 wt %, or from 98 to 99 wt % of the first composition, based on the sum weight of all polymer components of the composition. In one embodiment, the first composition comprises from 20 to 55 wt %, or from 20 to 50 wt %, or from 20 to 45 wt %, or from 20 to 40 wt %, or from 20 to 35 wt % of the first interpolymer, based on sum weight of the first and second interpolymer.

In one embodiment, the composition comprises from 10 to 50 wt %, or from 20 to 40 wt % of the first composition, based on the weight of the composition.

In one embodiment, the first composition has a density from 0.850 to 0.890 g/cc, or from 0.855 to 0.890 g/cc, or from 0.860 to 0.890 g/cc.

In one embodiment, the ethylene/α-olefin/nonconjugated polyene interpolymer has a weight average molecular weight (Mw) from 300,000 to 700,000 g/mole, or from 300,000 to 600,000 g/mole, or from 300,000 to 500,000 g/mole. In one embodiment, the interpolymer is an EAODM, and or an ethylene/propylene/diene (EPDM) terpolymer. In one embodiment, the diene is 5-ethylidene-2-norbornene (ENB).

In one embodiment, the first ethylene/alpha-olefin/non-conjugated polyene interpolymer has a MWD from 2.00 to 3.00, or from 2.00 to 2.70, or from 2.00 to 2.50. In one embodiment, the first ethylene/α-olefin/nonconjugated polyene interpolymer has a MWD less than, or equal to, 3.00, further less than, or equal to 2.90, further less than, or equal to 2.80. In a further embodiment, the interpolymer is an EAODM, further an ethylene/propylene/diene (EPDM) terpolymer. In one embodiment, the first ethylene/α-olefin/nonconjugated polyene interpolymer has a MWD greater than, or equal to, 2.05, further greater than, or equal to 2.10, further greater than, or equal to 2.15. In a further embodiment, the interpolymer is an EAODM, further an ethylene/propylene/diene (EPDM) terpolymer. In a further embodiment, the diene is 5-ethylidene-2-norbornene (ENB).

In one embodiment, the first ethylene/alpha-olefin/non-conjugated polyene interpolymer has a weight average molecular weight Mw from 300,000 to 700,000 g/mole, or from 400,000 to 600,000 g/mole.

In one embodiment, the first ethylene/alpha-olefin/non-conjugated polyene interpolymer has a tan delta (0.1 rad/s, 190° C.) from 1.60 to 3.00, or from 1.70 to 3.00, or from 1.70 to 2.30, or from 1.70 to 2.00.

In one embodiment, the first ethylene/alpha-olefin/non-conjugated polyene interpolymer has viscosity at 0.1 rad/sec, 190° C., from 300,000 Pa·s to 1,500,000 Pa·s, or from 400,000 to 1,500,000 Pa·s, or from 500,000 to 1,200,000 Pa·s. In a further embodiment, the interpolymer is an EAODM, and further an ethylene/-propylene/diene (EPDM) terpolymer. In a further embodiment, the diene is 5-ethylidene-2-norbornene (ENB).

In one embodiment, the first ethylene/alpha-olefin/non-conjugated polyene interpolymer has a rheology ratio (V0.1/V100 at 190° C.) from 50 to 100, further from 55 to 95, further from 60 to 90. In a further embodiment, the interpolymer is an EAODM, and further an ethylene/propylene/diene (EPDM) terpolymer. In a further embodiment, the diene is 5-ethylidene-2-norbornene (ENB).

The rheology properties of the first ethylene/alpha-olefin/nonconjugated polyene interpolymer (V0.1, V100, V0.1/

V100, tan delta, each at 190° C.) of the first ethylene/α-olefin/nonconjugated polyene interpolymer is that of the neat polymer (no oil, no filler). The polymer may be stabilized with "ppm amounts" of one or more antioxidants and/or other stabilizers.

In one embodiment, the first ethylene/alpha-olefin/nonconjugated polyene interpolymer has a density from 0.850 to 0.890 g/cc, or from 0.855 to 0.890 g/cc, or from 0.860 to 0.890 g/cc.

In one embodiment, the composition further comprises a crosslinking agent.

Also provided, is a crosslinked composition formed from an inventive composition.

Also is provided an article comprising at least one component formed from the composition of any one of the previous claims. In a further embodiment, the article is selected from the group consisting of profiles, injection molded parts, gaskets, automotive parts, building and construction materials, shoe components, and tubes.

In one embodiment, the first composition has a Mooney Viscosity greater than, or equal to, 30, further greater than, or equal to, 40 (ML 1+4, 125° C.). Mooney viscosity is that of the neat polymer (no oil, no filler). The polymer may be stabilized with "ppm amounts" of one or more antioxidants and/or other stabilizers.

In one embodiment, the first composition has a MWD less than, or equal to, 7.0, or less than, or equal to, 6.5, or less than, or equal to, 6.0, or less than, equal to, 5.5, or less than, or equal to, 5.0. In one embodiment, the first composition has a MWD greater than, or equal to, 2.0, further greater than, or equal to, 2.1.

In one embodiment, the first composition comprises from 40 to 90 weight percent ethylene, further from 50 to 90 weight percent ethylene, further from 55 to 85 weight percent ethylene, and further from 60 to 80 weight percent ethylene, based on the weight of the first composition.

In one embodiment, each ethylene/α-olefin/nonconjugated polyene interpolymer is, independently, an ethylene/α-olefin/diene interpolymer (EAODM). In a further embodiment, the interpolymer is an ethylene/propylene/diene terpolymer (EPDM). In a further embodiment, the diene is 5-ethylidene-2-norbornene (ENB).

In one embodiment, the first ethylene/α-olefin/nonconjugated polyene interpolymer is present in an amount from 20 to 60 weight percent, or from 25 to 50 weight percent, or from 30 to 45 weight percent, based on the weight of the first composition. In a further embodiment, the interpolymer is an EAODM, further an ethylene/propylene/diene (EPDM) terpolymer. In a further embodiment, the diene is 5-ethylidene-2-norbornene (ENB).

The first ethylene/α-olefin/nonconjugated polyene interpolymer, further an EAODM, and further an EPDM, may comprise a combination of two or more embodiments as described herein.

In one embodiment, the composition further comprises a crosslinking agent.

In one embodiment, the composition further comprises an oil.

In one embodiment, the composition further comprises a filler. Suitable fillers include, but are not limited to, clay, CaCO3, talc, carbon black, and mineral fibers. In one embodiment, the filler is present in an amount from 5 to 30 weight percent, based on the weight of the composition.

In one embodiment, an inventive composition further comprises at least one stabilizer. Suitable stabilizers include, but are not limited to, AO and UV stabilizers.

The inventive composition may comprise a combination of two or more embodiments described herein.

The invention also provides a crosslinked composition formed from an inventive composition of one or more embodiments described herein.

The invention also provides an article comprising at least one component formed from an inventive composition of one or more embodiments described herein. In a further embodiment, the article is selected from the group consisting of profiles, injection molded parts, gaskets, automotive parts, building and construction materials, shoe components, and tubes. In one embodiment, the article is an automotive part.

The invention also provides an article comprising at least one component formed from a crosslinked composition of one or more embodiments described herein. In a further embodiment, the article is selected from the group consisting of profiles, injection molded parts, gaskets, automotive parts, building and construction materials, shoe components, and tubes.

An inventive article may comprise a combination of two or more embodiments described herein.

Ethylene/α-Olefin/Nonconjugated Polyenes Interpolymers

The ethylene/α-olefin/nonconjugated polyene interpolymers (including the second ethylene/α-olefin/nonconjugated polyene interpolymers), for the inventive compositions described herein, comprise, in polymerize form, ethylene, an α-olefin, and a nonconjugated polyene. Suitable examples of α-olefins include the C3-C20 α-olefins, further C3-C10 α-olefins, and preferably propylene. Suitable examples of nonconjugated polyenes include the C4-C40 nonconjugated dienes.

The α-olefin may be either an aliphatic or an aromatic compound. The α-olefin is preferably a C3-C20 aliphatic compound, preferably a C3-C16 aliphatic compound, and more preferably a C3-C10 aliphatic compound. Preferred C3-C10 aliphatic α-olefins are selected from the group consisting of propylene, 1-butene, 1-hexene and 1-octene, and more preferably propylene. In a further embodiment, the interpolymer is an ethylene/propylene/-diene (EPDM) terpolymer. In a further embodiment, the diene is 5-ethylidene-2-norbornene (ENB).

Illustrative nonconjugated polyenes include straight chain acyclic dienes, such as 1,4-hexadiene and 1,5-heptadiene; branched chain acyclic dienes, such as 5-methyl-1,4-hexadiene, 2-methyl-1,5-hexadiene, 6-methyl-1,5-heptadiene, 7-methyl-1,6-octadiene, 3,7-dimethyl-1,6-octadiene, 3,7-dimethyl-1,7-octadiene, 5,7-dimethyl-1,7-octadiene, 1,9-decadiene, and mixed isomers of dihydromyrcene; single ring alicyclic dienes such as 1,4-cyclohexadiene, 1,5-cyclooctadiene and 1,5-cyclododecadiene; multi-ring alicyclic fused and bridged ring dienes, such as tetrahydroindene, methyl tetrahydroindene; alkenyl, alkylidene, cycloalkenyl and cycloalkylidene norbornenes such as 5-methylene-2-norbornene (MNB), 5-ethylidene-2-norbornene (ENB), 5-vinyl-2-norbornene, 5-propenyl-2-norbornene, 5-isopropylidene-2-norbornene, 5-(4-cyclopentenyl)-2-norbornene, and 5-cyclohexylidene-2-norbornene. The polyene is preferably a nonconjugated diene selected from the group consisting of ENB, dicyclopentadiene, 1,4-hexadiene, 7-methyl-1,6-octadiene, and preferably, ENB, dicyclopentadiene and 1,4-hexadiene, more preferably ENB and dicyclopentadiene, and even more preferably ENB.

In one embodiment, each ethylene/α-olefin/nonconjugated polyene interpolymer, independently, comprises a majority amount of polymerized ethylene, based on the weight of the interpolymer. In a further embodiment, the ethylene/α-olefin/nonconjugated polyene interpolymer is an ethylene/α-olefin/dene interpolymer. In a further embodiment, the interpolymer is an EPDM. In a further embodiment, the diene is ENB.

In one embodiment, each ethylene/α-olefin/nonconjugated polyene interpolymer, independently, has a molecular weight distribution (Mw/Mn) from 1.50 to 3.50, of from 1.60 to 3.00, further from 1.70 to 2.70. In a further embodiment, the ethylene/α-olefin/nonconjugated polyene interpolymer is an ethylene/α-olefin/dene interpolymer (EAODM). In a further embodiment, the interpolymer is an EPDM. In a further embodiment, the diene is ENB.

In one embodiment, each ethylene/α-olefin/nonconjugated polyene interpolymer has a Mooney viscosity, ML(1+4) at 125° C., greater than, or equal to, 20, further greater than, or equal to, 30, further greater than, or equal to 35. In a further embodiment, each ethylene/α-olefin/nonconjugated polyene interpolymer is an ethylene/α-olefin/dene interpolymer. In a further embodiment, the interpolymer is an EPDM. In a further embodiment, the diene is ENB. In one embodiment, each ethylene/α-olefin/nonconjugated polyene interpolymer has a Mooney viscosity, ML(1+4) at 125° C., less than 100, or less than, or equal to, 80, or less than, or equal to, 60. In a further embodiment, each ethylene/α-olefin/nonconjugated polyene interpolymer is an ethylene/α-olefin/dene interpolymer. In a further embodiment, the interpolymer is an EPDM. In a further embodiment, the diene is ENB.

Mooney viscosity is that of the neat interpolymer. The neat polymer refers to the polymer without filler and without oil.

An ethylene/alpha-olefin/nonconjugated polyene interpolymer may comprise a combination of two or more embodiments as described herein. An ethylene/alpha-olefin/diene interpolymer may comprise a combination of two or more embodiments as described herein. An EPDM terpolymer may comprise a combination of two or more embodiments as described herein.

Crosslinking Agents

Crosslinking agents include, but are not limited to, sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; metal oxides, such as zinc, magnesium, and lead oxides; dinitroso compounds, such as p-quinone-dioxime and p,p'-dibenzoylquinone-dioxime; and phenol-formaldehyde resins containing hydroxymethyl or halomethyl functional groups. The suitability of any of these vulcanizing agents for use in the invention will be largely governed by the choice of polymers, as is well known to those skilled in the compounding art. Sulfur can be a crystalline elemental sulfur or an amorphous elemental sulfur, and either type can be in pure form or supported on an inert carrier. An example of a supported sulfur is Rhenogran S-80 (80% S and 20% inert carrier) from Rhein Chemie.

In one embodiment of the invention, the sulfur containing compounds and the peroxides are the preferred crosslinking agents, and the sulfur containing compounds are most preferred. It is understood that mixtures of these vulcanizing agents can be employed, though this is generally not preferred. The amount of the vulcanizing agent can range from about 1 to 10 parts by weight, based upon 100 parts of the polymers in the composition. Vulcanization temperatures and time employed are typical. Temperatures ranging from about 250° F. to about 440° F., and times ranging from about one minute to about 120 minutes can be employed.

Additional crosslinking agents include, but are not limited to, phenolic resins, azides, aldehyde-amine reaction products, vinyl silanes, hydrosilylation, substituted ureas, substituted guanidines; substituted xanthates; substituted dithiocarbamates; and combinations thereof. See Encyclopedia of Chemical Technology, Vol. 17, 2nd edition, Interscience Publishers, 1968; also Organic Peroxides, Daniel Seern, Vol. 1, Wiley-Interscience, 1970), which are incorporated by reference herein in their entirety. The crosslinking agent may be a phenolic curing agent or a peroxide curing agent, with an optional co-agent, or hydrosilylation cross-linking agent with a hydrosilylation catalyst, or dibutyl tin dilaurate ("DBTDL"), with an optional co-agent alumina trihydrate ("ATH"), for silane-grafted interpolymer. A phenolic resin and $SnCl_2$ is used for EPDM curing (peroxide, or sulfur or hydrosilation curing systems can also be used). Suitable peroxides include, but are not limited to, aromatic dactyl peroxides; aliphatic dactyl peroxides; dibasic acid peroxides; ketene peroxides; alkyl peroxyesters; alkyl hydroperoxides (for example, diacetylperoxide; dibenzoylperoxide; bis-2,4-dichlorobenzoyl peroxide; di-tert-butyl peroxide; dicumylperoxode; tert-butyl-perbenzoate; tert-butylcumylperoxide; 2,5-bis (t-butylperoxy)-2,5-dimethylhexane; 2,5-bis (t-butylperoxy)-2,5-dimethylhexyne-3; 4,4,4',4'-tetra-(t-butylperoxy)-2,2-dicyclohexylpropane; 1,4-bis-(t-butylperoxyisopropyl)-benzene; 1,1-bis-(t-butylperoxy)-3,3,5-trimethylcyclohexane; lauroyl peroxide; succinic acid peroxide; cyclohexanone peroxide; t-butyl peracetate; butyl hydroperoxide; and the like. A crosslinking agent may comprise a combination of two or more embodiments as described herein.

Oils

Oils include, but are not limited to, petroleum oils, such as aromatic and naphthenic oils; polyalkylbenzene oils; organic acid monoesters, such as alkyl and alkoxyalkyl oleates and stearates; organic acid diesters, such as dialkyl, dialkoxyalkyl, and alkyl aryl phthalates, terephthalates, sebacates, adipates, and glutarates; glycol diesters, such as tri-, tetra-, and polyethylene glycol dialkanoates; trialkyl trimellitates; trialkyl, trialkoxyalkyl, alkyl diaryl, and triaryl phosphates; chlorinated paraffin oils; coumarone-indene resins; pine tars; vegetable oils, such as castor, tall, rapeseed, and soybean oils and esters and epoxidized derivatives thereof; and the like.

In one embodiment, the oil is present in an amount from 5 to 70 weight percent, further from 5 to 60 weight percent, further from 5 to 50 weight percent, based on the weight of the composition. In one embodiment, the oil is selected from the group consisting of nonaromatic oils, paraffinic oils, naphthenic oils, and combinations thereof. Suitable oils include, but are not limited to, SUNPAR 2280, PARALUX 6001, HYDROBRITE 550, and CALSOL 5550. An oil may comprise a combination of two or more embodiments as described herein.

Additives

An inventive composition may comprise one or more additional additives. Suitable additives include, but are not limited to, fillers, antioxidants and antiozonants, UV stabilizers, flame retardants, colorants or pigments, and combinations thereof. Fillers include, but are not limited to, carbon black, silicates of aluminum, magnesium, calcium, sodium, potassium and mixtures thereof; carbonates of calcium, magnesium and mixtures thereof; oxides of silicon, calcium, zinc, iron, titanium, and aluminum; sulfates of calcium, barium, and lead; alumina trihydrate; magnesium hydroxide; natural fibers, synthetic fibers, and the like. Some antioxidants and antiozonants include, but are not limited to, hindered phenols, bisphenols, and thiobisphenols; and substituted hydroquinones. Foaming agents, such as azodicarbonamide, can be used for making a foam structure.

In one embodiment, an inventive composition further comprises a thermoplastic polymer. Polymers, include, but not limited to, propylene-based polymers, ethylene-base polymers, and olefin multi-block interpolymers. Suitable ethylene-base polymers include, but are not limited to, high density polyethylene (HDPE), linear low density polyethylene (LLDPE), very low density polyethylene (VLDPE), ultra low density polyethylene (ULDPE), homogeneously branched linear ethylene polymers, and homogeneously branched substantially linear ethylene polymers (that is homogeneously branched long chain branched ethylene polymers).

Applications

The compositions of the present invention may be used to prepare a variety of articles or manufacture, or their component parts or portions. The inventive compositions may be converted into a finished article of manufacture by any one of a number of conventional processes and apparatus. Illustrative processes include, but are not limited to, extrusion, calendering, compression molding, and other typical thermoset material forming processes.

Articles include, but are not limited to, sheets, foams, molded goods, and extruded parts. Additional articles include automotive parts, weather strips, belts, hoses, building profiles, wire and cable jacketing, flooring materials, gaskets, tires and tire components, computer parts, building materials and footwear components. A skilled artisan can readily augment this list without undue experimentation.

Definitions

Unless stated to the contrary, implicit from the context, or customary in the art, all parts and percents are based on weight, and all test methods are current as of the filing date of this disclosure.

The term "composition," as used herein, includes the material(s), which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts of impurities, such as catalyst residues, can be incorporated into and/or within the polymer. The term "interpolymer," as used herein, refers to polymers prepared by the polymerization of at least two different types of monomers. The term interpolymer thus includes the term copolymer (employed to refer to polymers prepared from two different types of monomers) and polymers prepared from more than two different types of monomers.

The term "ethylene-based polymer," as used herein, refers to a polymer that comprises, in polymerized form, a majority weight percent of ethylene (based on the weight of the polymer), and optionally may comprise one or more comonomers. The term "ethylene-based interpolymer," as used herein, refers to a polymer that comprises, in polymerized form, a majority weight percent of ethylene (based on the weight of the interpolymer), and at least one comonomer.

The term "ethylene/α-olefin/nonconjugated polyene interpolymer," as used herein, refers to a polymer that comprises, in polymerized form, ethylene, an α-olefin, and a nonconjugated polyene. In one embodiment, the "ethylene/α-olefin/nonconjugated polyene interpolymer" comprises a majority weight percent of ethylene (based on the weight of the interpolymer).

The term "ethylene/α-olefin/diene interpolymer," as used herein, refers to a polymer that comprises, in polymerized form, ethylene, an α-olefin, and a diene. In one embodiment, the "ethylene/α-olefin/diene interpolymer" comprises a majority weight percent of ethylene (based on the weight of the interpolymer).

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the phrase, "consisting essentially of" excludes from the scope of any succeeding recitation any other component, step or procedure, excepting those that are not essential to operability. The phrase "consisting of" excludes any component, step or procedure not specifically delineated or listed.

Test Methods

Gel Permeation Chromatography (Conventional)

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4-trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene}=A\times(M_{polystyrene})^B$, where M is the molecular weight, A has a value of 0.431 and B is equal to 1.0 (as described in Williams and Ward, *J. Polym. Sc., Polym. Let.*, 6, 621 (1968)). Polyethylene equivalent molecular weight calculations were performed using Viscotek TriSEC software Version 3.0.

FTIR Method for EPDM Composition Analysis for Wt % C2, Wt % ENB,

The terpolymers containing ethylene, propylene, and 5-ethylidene-2-norbornene were analyzed using ASTM D3900 for its ethylene content, and ASTM D6047 for its ethylidene-norbornene or dicyclopentadiene content.

13C NMR Method for EPDM Composition Analysis—for the iCBI and Tacticity (% mm)

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temperature CryoProbe. The data was acquired using "160 scans per data file," a six second pulse repetition delay, with a sample temperature of 120° C. The acquisition was carried out using a spectral width of 25,000 Hz and a file size of 32K data points.

NMR spectral analysis of each composition of the examples was carried out using the following analysis method. Quantitation of monomers present in EPDM can also be calculated using the following equations (1 through 9). The calculation of moles ethylene normalizes the spectral range from 55.0 to 5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3*molesP - 7*molesENB)}{2};$$ Equation 1

$$molesENB=CH3(13.6\text{-}14.7 \text{ ppm});$$ Equation 2

$$molesP=CH3(19.5\text{-}22.0 \text{ ppm});$$ Equation 3

$$\text{mole \% ethylene} = \frac{100*molesE}{molesE - molesP + molesENB};$$ Equation 4

$$\text{mole \% propylene} = \frac{100*molesP}{molesE + molesP + molesENB};$$ Equation 5

$$\text{mole \% ENB} = \frac{100*molesENB}{molesE + molesP + molesENB};$$ Equation 6

$$\text{Wt \% ethylene} = \frac{100*\text{mole \% }E*28}{\text{mole \% }E*28 + \text{mole \% }P*42 + \text{mole \% }ENB*120};$$ Equation 7

$$\text{Wt \% propylene} = \frac{100*\text{mole \% }P*42}{\text{mole \% }E*28 + \text{mole \% }P*42 + \text{mole \% }ENB*120};$$ Equation 8

$$\text{Wt \% }ENB = \frac{100*\text{mole \% }ENB*120}{\text{mole \%}E*28 + \text{mole \% }P*42 + \text{mole \% }ENB*120}.$$ Equation 9

Propylene Tacticity % mm Area 13C NMR

13C NMR spectral analysis of the EPDMS to quantitate the level of tacticity % mm was performed in a "50/50 mixture of tetrachloroethane-d2/orthodichlorobenzene", as described above.

An NMR spectral analysis (see above) of the inventive EPDMs displayed a peak area from 21.3-22.4 ppm greater than 3.5% of the total integral area from 19.5 to 22.4 ppm. Similar spectral analysis of the comparative EPDMs showed less than 3.5% of the total integral area from 19.5 to 22.4 ppm. Spectral data were referenced to the EEE backbone at 30 ppm. Peak responses in this region typically are related to differences in propylene tacticity (% mm) that have been incorporated into the EPDM. A similar analysis can be done for another type of ethylene/α-olefin/nonconjugated polyene interpolymer.

Intermediate Chain Branching % Area 13C NMR

13C NMR spectral analysis of the EPDMs to quantitate the level of intermediate chain branching was performed using tetrachloroethane-d2 with 0.025 M chromium acetylacetonate, to improve the spectral resolution in the 34.6-34.4 ppm region. The samples were prepared by adding approximately "2.6 g" of a "tetrachloroethane-d2 with 0.025 M chromium acetylacetonate" to "0.3 g sample" in a 10 mm NMR tube. The samples were dissolved, and homogenized, by heating the tube and its contents to 140° C. The data were collected using a Bruker 400 MHz spectrometer with inverse gated NMR pulse, equipped with a Bruker Dual DUL high-temperature Cryoprobe. The data was acquired using "8000 scans per data file," a 7.3 second pulse repetition delay, with a sample temperature of 120° C. Spectral data were referenced to the EEE backbone at 30 ppm.

Further 13C NMR spectral analysis of the inventive EPDMs displayed a methylene peak in the region from 34.4-34.6 ppm which is greater than 0.01% of the total integral area from 160.0 to 100.0 ppm plus 60.0 to 0.00 ppm (whole spectra excluding tetrachloroethane solvent). Similar spectral analysis of the comparative EPDMs showed less than 0.01% of the total integral area from 160.0 to 100.0 ppm plus 60.0 to 0.00 ppm (whole spectra excluding tetrachloroethane solvent). To convert the observed peak area from 34.6 ppm to 34.4 ppm to an intermediate chain branching index per 1000 carbons (iCBI), the area from 34.6 ppm to 34.4 ppm is multiplied by 3.33 to account for the three alpha carbons surrounding the branch (ten carbons divided by three alpha carbons). The inventive EPDMs displayed an IBCI of greater than 0.03 branches per 1000 carbons.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and the beginning of the test, was set to five minutes for all samples. The experiments were performed at 190° C., over a frequency range of 0.1 to 100 rad/s. The strain amplitude was adjusted, based upon the response of the samples from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platens (15-20° C.) for two minutes. The rheology properties (V0.1/V100 at 190° C.; also referred to as "RR", tan delta (0.1 rad/s, 190° C.) and tan delta (100 rad/s, 100° C.) were recorded.

Shore A Hardness

Hardness measurements were measured with a Shore A type durometer (ASTM D2240) with a five second delay. The durometer was placed onto a compression molded plaque, as described herein. Average of five measurements reported.

Mooney Viscosity

Mooney Viscosity (ML1+4 at 125° C.) was measured in accordance with ASTM 1646, with a one minute preheat time and a four minute rotor operation time. The instrument is an Alpha Technologies Mooney Viscometer 2000. The Mooney viscosity of each formulated compositions was measured using an uncured blanket (see experimental section), so that the viscosity of the uncured composition could be examined. Samples were conditioned for 24 hours at room temperature, prior to testing.

MDR Analysis (Cure Properties)

The cure kinetic profiles of each formulation at 160° C. and 180° C. were measured using an Alpha technology moving die rheometer (MDR) in accordance to ASTM D5289. Each test sample was prepared in accordance with ASTM D5289, Sections 7 and 8, using a sample cutting die from Alpha Technologies (model 2000R). The MDR Test was carried out at 160° C. and 180° C. over a period of 30 minutes. The rheology or curve of torque as a function of time for each formulated composition was measured from samples of uncured blanket, which was then cured during the MDR analysis. Samples were conditioned for 24 hours at room temperature, prior to testing. The visco-elastic properties, such as minimum S' torque (ML), maximum S' torque (MH), tan delta @ML, tan delta @MH, and time to reach a certain percentage of the cure state (for example, t95 corresponds to the time in minutes to reach the 95% state of cure), were measured during the cure cycle.

Rubber Process Analyzer (Rheological Properties of Uncured Compounds)

The rheological properties of each formulation at 100° C. were measured using an Alpha technology Rubber Process Analyzer (RPA) in accordance to ASTM 6204. Each test sample was prepared in accordance with ASTM D6204, Sections 7 and 8, using a sample cutting die from Alpha Technologies (model 2000R). The RPA Test was carried out at 100° C., over a strain range from 10% to 200%. The rheology or curve of torque as a function of strain for each formulated composition was measured from samples of uncured blanket. Samples were conditioned for 24 hours at room temperature, prior to testing. The visco-elastic properties, such as minimum S' torque, tan delta were measured.

Compression Molded Plaques

The physical properties of the formulations were measured from vulcanized sheets, cured in a compression molder (for tensile, compression set testing, temperature retraction). Samples from the uncured blankets were cut, heated and cured in a compression molder to make test specimens in accordance with ASTM D3182, using a PHI (100 ton press). The desired mold (6 in.×6 in., or compression buttons) was placed on a platen. The sample (uncured blanket) was cut slightly smaller than the dimensions of the individual mold cavity. The mill direction was marked, and the sample was labeled. The mold was spray brushed with a dilute solution of silicone. The samples were in a preheated mold, taking care to place properly for mill direction. The platens were closed. The "normal" operating pressure was 100 tons, or as shown on the gauge as 200,000 pounds. When cure time ended, the bottom platen automatically opened. The samples were removed, and immediately placed in water to stop the curing. Samples were conditioned for 24 hours at room temperature, prior to testing. To cure (cure time) the samples, the samples were under minimum compression pressure of 3.5 MPa (500 psi) at 180° C. using t95 data (determined from MDR) plus three minutes for plaques, and using t95 (determined from MDR) data plus 15 minutes for compression set buttons.

Compression Set

Compression set was measured according to ASTM D395 at various temperatures. Compression set buttons of 29 mm (±0.5 mm) in diameter and 12.7 mm (±0.5 mm) thickness, were prepared as described under the section for compression molding. Each button sample was inspected for notches, uneven thickness and inhomogeneity, and selected buttons (without those defects) were tested. Compression set was performed on two specimens for each sample, at the temperatures specified, and the average results of the two specimens was reported. The button sample was placed in the compression device having two metal plates that could be pressed together, and locked into place at 75% of the original height of the button sample. The compression device, with the compressed samples, was then placed in an oven, and equilibrated at the appropriate temperature for a specified time (70 hrs for 23° C., 70° C. or 150° C.). In this test, the stress was released at the test temperature, and the thickness of the sample was measured after a 30 minute equilibration period at room temperature. Compression set is a measured of the degree of recovery of a sample following compression, and is calculated according to the equation CS=(H0−H2)/(H0−H1); where H0 is the original thickness of the sample, H1 is the thickness of the spacer bar used, and H2 is the final thickness of the sample after removal of the compressive force. Average of three measurements reported.

Tensile Stress-Strain Properties

Tensile properties were measured using specimens which were die cut, using a small "dog bone" shaped micro tensile die, having the dimensions described in ASTM D-1708.

Three die cut specimens were cut from the compression molded plaques, which were prepared as described under the Compression Molding section. Tensile properties (tensile strength and elongation) were measured at room temperature, following the method ASTM D-412, in the machine direction of an INSTRON MODEL 1122, made by INSTRU-MET. Average of three measurements reported.

EXPERIMENTAL

Continuous Polymerizations

In general terms, it is desirable to produce the inventive polymer under the conditions as explained in U.S. Pat. Nos. 5,977,251 and 6,545,088, and the references therein. The polymer products are produced in a solution polymerization process using a continuously mixed reactor system (CSTR followed by a loop). Ethylene is introduced in a mixture of a solvent of ISOPAR E (a mixture of C8-C10 saturated hydrocarbons available from ExxonMobil), propylene and 5-ethylidene-2-norbornene (ENB), forming the reactor feed stream. Catalyst is fed to the reactor separately and activated in-situ using co-catalyst 1 and co-catalyst 2. The outlet of the reactor is consequently a mixture of polymer, solvent, and reduced levels of the initial monomer streams. The polymerization reactions are performed under steady state conditions, that is, constant reactant concentration and continual input of solvent, monomers, and catalyst, and withdrawal of unreacted monomers, solvent and polymer. The reactor system is cooled and pressured to prevent formation of a vapor phase.

After polymerization, a small amount of water is introduced into the reactor exit stream as a catalyst kill, and the reactor exit stream is introduced into a flash vessel, in which the solids concentration is increased by at least 100 percent. A portion of the unreacted monomers, that is, ENB, ethylene, and propylene, and the unused diluent are then collected, and recycled back to the reactor feeds as appropriate. Tables 1A, 1B and 2 outline the reaction conditions used to produce some the inventive first compositions, prepared using two consecutive reactors with first CSTR reactor and a second (final) loop reactor. Reactor volume for the CSTR, equipped with an impeller, is 20.1 gallons, and the reactor volume for the loop reactor is 30.6 gallons. The polymer product is separated and pelletized.

Examples designated with "R1" are of the polymer solution aliquots from the first reactor, and are representative of the polymer composition that is fed to the second reactor. In the case of the aliquots, polymer and solvent samples are collected, and subsequently dried in-vacuo, to recover the polymer. Polymer properties of some first ethylene/alpha-olefin/non-conjugated polyenes (EPDMs) are shown in Tables 3. Properties of the inventive and comparative first compositions are shown in Tables 4-6 (note: NA=Not Available; ND=Not Detected).

Compound Formulations

Formulations are mixed with a rubber internal mixer, i.e., KOBELCO 0M lab mixer with 3-liter net chamber volume, in accordance to ASTM D 3182. The mixer is equipped with a pair of six-wing VCMT (Various Clearance Mixing Technology) rotors. Both rotor body and mixing chamber interior surface are chrome plated. The mixer can achieve rotor speeds from 0-122 rpm, and is controlled by a mixing control and data acquisition system. The temperature of mixer's chamber, doors and rotors are separately controlled with two separate temperature control units (TCU) and the ram pressure is set at 35 psi.

A standard "up-side down" mix is used, with carbon black, CaCO3, PEG, stearic acid, and zinc oxide added first; followed by oil injection, and the first composition is added last to the mixer. The batch weight is sized to have 75% fill factor (3.0 L net chamber volume). The rotor and mixer chamber (front/back door) temperature is set at 60° C. The rotor speed is kept constant at 35 rpm during the mixing cycle. The formulation is dropped at 110° C. During the mixing, the process parameters, i.e., torque percentage, ram position, compound temperature etc. are recorded. Mixing is completed on a 2 roll mill at ambient conditions, a compound blanket is sheeted out to use for further testing. Inventive and comparative formulations are listed in Tables 7-10. Samples were cut according to in accordance with ASTM D 5289 using a Sample Cutter Model 2000R from Alpha Technologies. Cure properties are shown in Tables 11-14.

Figure 3:
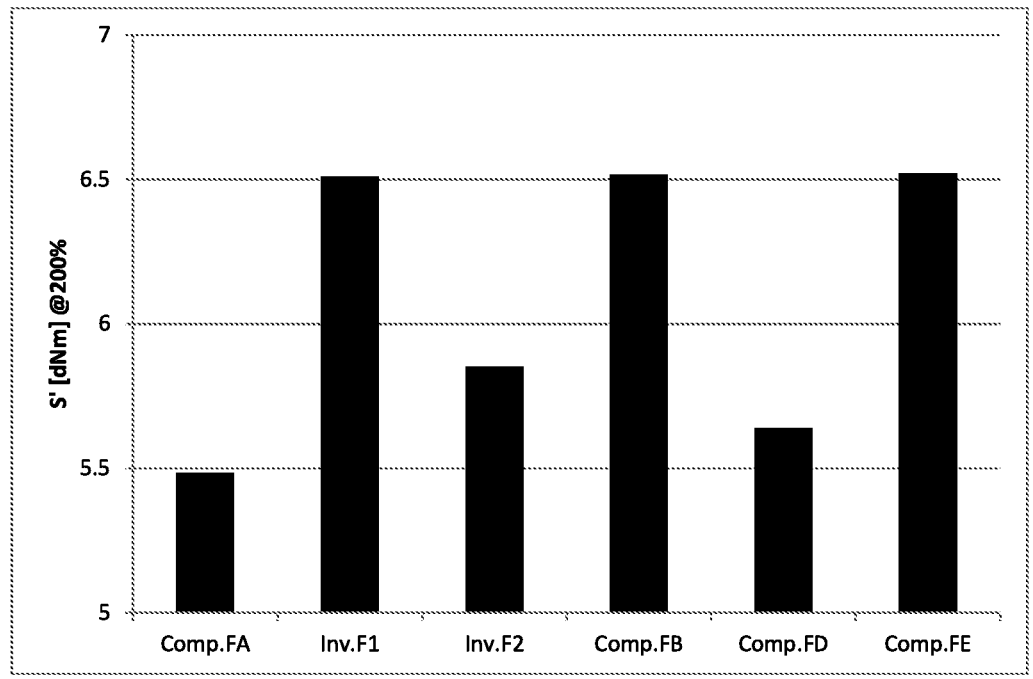
FIGS. 3-5 each depict a bar graph of the green strength (S' at 200%) for inventive and comparative compositions.
Figure 4:
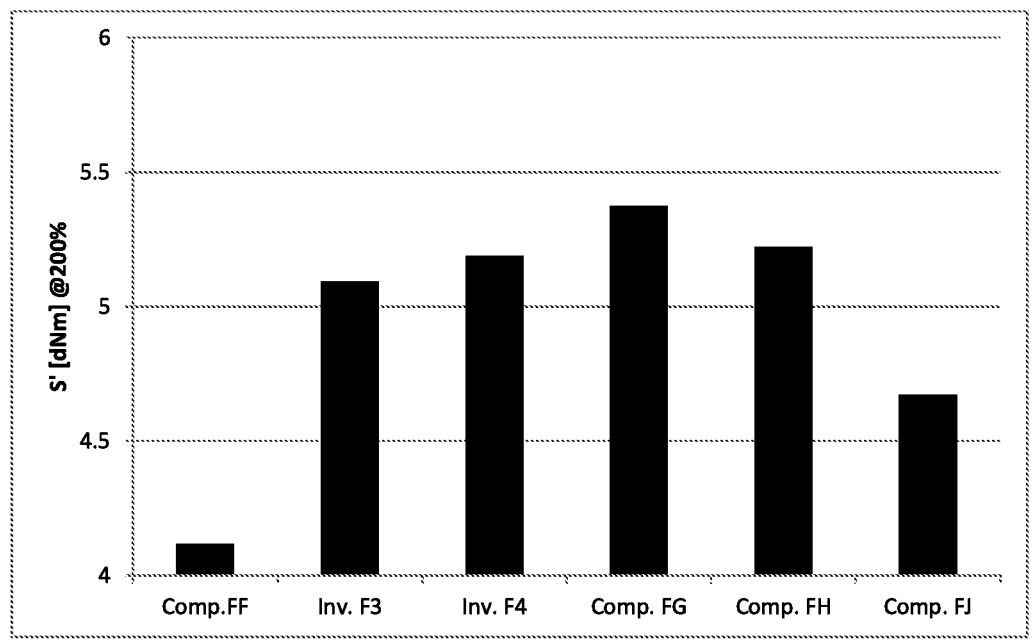
Figure 5:
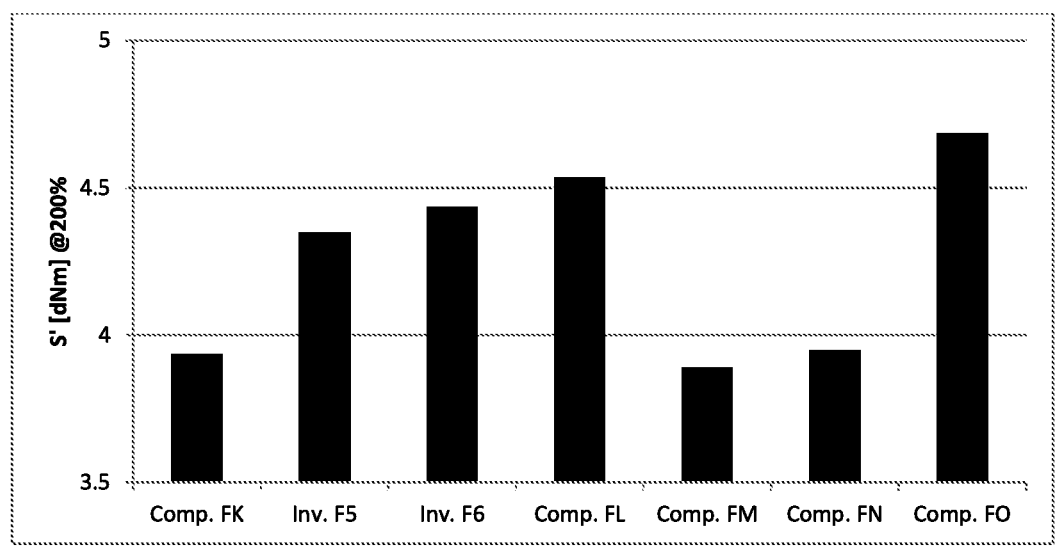

Compound Green Strength: Green strength is the tensile modulus or tensile strength of an uncured rubber compound. Green strength is commonly performed on tensile testing instruments in accordance with International Standard ISO 9026. A RPA (Rubber Processing Analyzer) testing, in accordance with ASTM D 6204, were studied and established by the Alpha Technologies, to correlate the RPA properties and green strength for the rubber compounds. The measured S' torque at high strains (100-500%) for a given temperature (e.g. RT to 100° C.) is correlated to the green strength measured by tensile testing. Higher S' represents higher green strength which has utility for dimensional stability of the uncured article and handling of the green/uncured compound. The findings are published in the technical paper "J. Dick, Quality Assurance of Natural Rubber Using the Rubber Process Analyzer" presented at a meeting of the rubber division, American Chemical Society in May, 1997. In this study, a Rubber Processing Analyzer-2000P (RPA), from Alpha Technologies, is used to analyze the formulation's dynamic properties. The test specimen is taken from the mixed rubber formulation, in accordance with ASTM D6204. A strain sweep testing procedure with frequency of 6 cpm, at 100° C., are used to measure the green strength of each formulation, the "S' at 200% strain/angle" is used to represent the green strength of the formulation. Results are shown in Tables 15-18 and FIGS. 3-5.

TABLE 1A

Process Conditions (CSTR (Rx1) followed by Loop Reactor (Rx2))

| Inv Ex. | H2 (mol %)[A] | | C2 Conc. [g/L] | | Catalyst Efficiency* [lb_poly/lb_metal] x10E6 | | Catalyst Flow* [lb/hr] Cat. A or B* | | Catalyst Solution Conc. (ppm) | |
|---|---|---|---|---|---|---|---|---|---|---|
| | Rx1 | Rx2 | Rx1 | Rx2 | Rx1 | Rx2 | Rx1 | Rx2 | Rx1 | Rx2 |
| 1 | 0.009 | 0.560 | 19.74 | 9.41 | 2.91 | 1.12 | 0.30 A | 0.34 A | 19.90 | 99.98 |
| 2 | 0.019 | 0.228 | 19.99 | 10.69 | 2.95 | 0.91 | 0.37 A | 0.46 A | 19.90 | 99.98 |
| 3 | 0.017 | 0.176 | 19.34 | 9.24 | 2.70 | 0.54 | 0.23 A | 0.67 A | 39.92 | 99.98 |
| 4 | 0.013 | 0.182 | 20.65 | 7.39 | 2.27 | 0.41 | 0.45 A | 0.52 A | 19.90 | 125.00 |
| 5 | 0.014 | 0.142 | 22.44 | 8.60 | 2.93 | 0.34 | 0.76 A | 0.26 A | 9.89 | 125.00 |
| 6 | 0.013 | 0.124 | 19.23 | 4.93 | 3.65 | 0.15 | 0.59 A | 0.71 A | 9.89 | 250.01 |
| 7 | 0.019 | 0.697 | 19.73 | 8.37 | 3.40 | 2.19 | 0.61 B | 1.20 B | 9.89 | 9.89 |
| 8 | 0.02 | 0.18 | 19.15 | 9.93 | 5.13 | 4.29 | 0.52 A | 1.06 A | 9.89 | 9.89 |

*Catalyst A: [[6',6'''-((2R,4S)-pentane-2,4-diylbis(oxy))bis(3-(3,6-di-tert-butyl-9H-carbazol-9-yl)-3'-fluoro-5-(2,4,4-trimethylpentan-2-yl)-[1,1'-biphenyl]-2-ol)]](2-)]-zirconium dimethyl. Catalyst B: [[2',2'''-[1,3-propanediylbis(oxy-kO)]bis[3-[3,6-bis(1,1-dimethylethyl)-9H-carbazol-9-yl]-5'-fluoro-5-(1,1,3,3-tetramethylbutyl)[1,1'-biphenyl]-2-olato-kO]](2-)]-hafnium dimethyl.
[A]The mol % H2 is relative to the total reactant monomer feed to product the polymer (C2, C3, ENB).

TABLE 1B

Process Conditions (CSTR (Rx1) followed by Loop Reactor (Rx2))

| Inv. Ex. | Cocat-1** Flow [lb/hr] | | Cocat-1 Solution Conc. [ppm] | | Cocat-2*** Flow [lb/hr] | | Cocat-2 Solution Conc. [ppm] | | Production Rate [lb/hr] | |
|---|---|---|---|---|---|---|---|---|---|---|
| | Rx1 | Rx2 | Rx1 | Rx2 | Rx1 | Rx2 | Rx1 | Rx2 | Rx1 | Rx2 |
| 1 | 0.33 | 0.52 | 499.98 | 1749.95 | 0.29 | 0.49 | 195.31 | 615.46 | 17.76 | 38.60 |
| 2 | 0.38 | 0.69 | 499.98 | 1749.95 | 0.33 | 0.66 | 195.31 | 615.46 | 21.61 | 42.15 |
| 3 | 0.14 | 1.01 | 1749.95 | 1749.95 | 0.17 | 0.60 | 996.31 | 996.31 | 24.85 | 36.54 |
| 4 | 0.35 | 0.49 | 749.98 | 3499.89 | 0.37 | 0.58 | 244.13 | 996.31 | 21.17 | 26.68 |
| 5 | 0.26 | 0.62 | 749.98 | 3499.89 | 0.28 | 0.73 | 244.13 | 996.31 | 21.25 | 28.15 |
| 6 | 0.20 | 0.67 | 749.98 | 6999.79 | 0.21 | 0.94 | 244.13 | 1992.61 | 20.86 | 26.53 |
| 7 | 0.22 | 0.44 | 374.99 | 374.99 | 0.38 | 0.53 | 117.18 | 117.18 | 20.84 | 26.21 |
| 8 | 0.27 | 0.55 | 499.98 | 499.98 | 0.23 | 0.47 | 195.31 | 195.31 | 26.37 | 44.66 |

**Cocatalyst-1 is a mixture of methldi(C14-18 alkyl)ammonium salts of tetrakis(pentafluorophenyl)borate, prepared by reaction of a long chain trialkylamine (ARMEEN M2HT, available from Akzo-Nobel, Inc.), HCl and Li[B(C6F5)4], substantially as disclosed in USP 5,919,988 (Ex. 2). Cocatalyst-1 is purchased from Boulder Scientific, and used without further purification.

***Cocatalyst-2 (modified methylalumoxane (MMAO)) is purchased from Akzo Nobel, and used without further purification.

TABLE 2

Process Conditions (CSTR (Rx1) followed by Loop Reactor (Rx2))

| Inv. Ex. | Reactor Temp. [° C.] | | Pressure [psig] | | Solvent Feed [lb/hr] | | Ethylene Feed [lb/hr] | | Propylene Feed [lb/hr] | | ENB Feed [lb/hr] | | % C2 Conversion | | Rnx Config. | |
|---|---|---|---|---|---|---|---|---|---|---|---|---|---|---|---|---|
| | Rx1 | Rx2 | Rx1 | Rx2 | Rx1 | Rx2 | Rx1 | Rx2 | Rx1 | Rx2 | Rx1 | Rx2 | Rx1 | Rx2 | Rx1 | Rx2 |
| 1 | 110.39 | 139.97 | 714.99 | 701.34 | 266.58 | 333.77 | 19.04 | 30.44 | 20.88 | 8.94 | 3.62 | 1.85 | 51.21 | 74.36 | R-600 | R-216 |
| 2 | 110.54 | 140.07 | 724.83 | 712.35 | 339.32 | 302.55 | 24.07 | 27.21 | 26.05 | 19.55 | 4.55 | 2.93 | 50.67 | 69.29 | R-600 | R-216 |
| 3 | 111.40 | 140.02 | 741.74 | 724.84 | 297.96 | 293.92 | 22.14 | 23.81 | 36.38 | 9.79 | 5.35 | 2.09 | 52.65 | 70.69 | R-600 | R-216 |
| 4 | 112.76 | 139.97 | 733.58 | 724.75 | 197.98 | 307.46 | 15.57 | 12.05 | 37.24 | 14.22 | 3.97 | 2.11 | 49.37 | 65.89 | R-600 | R-216 |
| 5 | 111.85 | 139.95 | 725.64 | 723.39 | 195.12 | 297.76 | 16.06 | 12.51 | 40.87 | 24.44 | 4.20 | 2.42 | 46.49 | 62.32 | R-600 | R-216 |
| 6 | 110.11 | 140.07 | 733.80 | 726.56 | 198.81 | 199.15 | 14.83 | 7.76 | 37.25 | 10.86 | 3.85 | 1.13 | 50.29 | 76.17 | R-600 | R-216 |
| 7 | 120.69 | 139.81 | 728.28 | 727.49 | 201.03 | 121.45 | 14.59 | 18.04 | 34.99 | 29.57 | 2.75 | 2.00 | 49.06 | 72.77 | R-600 | R-216 |
| 8 | 110.24 | 120.02 | 773.04 | 725.09 | 361.27 | 108.60 | 28.64 | 27.77 | 26.39 | 8.93 | 5.78 | 2.23 | 56.69 | 79.07 | R-600 | R-216 |

TABLE 3

Properties of First EPDM from CSTR (Rx1)

| Inv. Ex. | Ethylene wt % | ENB wt % | Mw, g/mol | Mz, g/mol | V0.1 rad/s, 190° C., Pa·s | V100 rad/s, Pa·s | V0.1/V100 | TanDelta @ 0.1 rad/s | MWD |
|---|---|---|---|---|---|---|---|---|---|
| 1 | 66.7 | 3.47 | 431966 | 865,114 | 1129390 | 12956 | 87.2 | 1.8 | 2.18 |
| 2 | 50.9 | 4.00 | 438901 | 889,820 | 670631 | 8115 | 82.6 | 1.8 | 2.20 |
| 8 | 69.3 | 3.90 | 371260 | 710880 | 705975 | 11208 | 63.0 | 2.1 | 2.12 |

TABLE 4

Property Data for Inventive Examples (First Composition)

| First Comp. | | 1 | 2 | 3 | 4 | 5 | 6 | 7 | 8 |
|---|---|---|---|---|---|---|---|---|---|
| wt % C2 | | 71.74 | 70.49 | 65.58 | 47.69 | 45.88 | 42.26 | 44.94 | 70.68 |
| wt % ENB | | 3.91 | 4.24 | 5.15 | 4.98 | 4.75 | 5.26 | 4.61 | 4.72 |
| Mooney Viscosity | MU | 29.2 | 69.5 | 70.6 | 70.7 | 69.9 | 72.3 | 69.1 | 70.7 |
| Mn | g/mol | 35831 | 63907 | 72384 | 71870 | 84726 | 93786 | 77009 | 64920 |
| Mw | g/mol | 236485 | 264574 | 259135 | 271667 | 271969 | 291675 | 243348 | 239711 |
| Mz | g/mol | 969695 | 863056 | 786309 | 803284 | 744935 | 775656 | 628529 | 665770 |
| Mw/Mn | | 6.60 | 4.14 | 3.58 | 3.78 | 3.21 | 3.11 | 3.16 | 3.69 |
| V (0.1) | Pa·s | 94335 | 116420 | 107278 | 125713 | 109068 | 116815 | 131907 | 86018 |
| V (100) | Pa·s | 1827 | 3927 | 3835 | 3182 | 3385 | 3091 | 3208 | 3042 |

TABLE 4-continued

Property Data for Inventive Examples (First Composition)

| First Comp. | | 1 | 2 | 3 | 4 | 5 | 6 | 7 | 8 |
|---|---|---|---|---|---|---|---|---|---|
| V0.1/V100 | | 51.65 | 29.65 | 27.97 | 39.51 | 32.22 | 37.79 | 41.14 | 28.27 |
| TD (0.1) | | 1.80 | 2.17 | 2.01 | 1.74 | 1.73 | 1.71 | 1.27 | 2.05 |
| TD (100) | | 0.59 | 0.59 | 0.56 | 0.50 | 0.50 | 0.46 | 0.51 | 0.57 |
| 13 CNMR % Peak Area 21.3-22.4 ppm | % | 5.7 | NA | NA | 20.6 | 21.7 | NA | 15 | 7.1 |
| 13 CNMR % Peak (iCB Marker) 34.4 ppm-34.6 ppm | % | 0.16 | NA | NA | NA | >0.01 | NA | NA | 0.30 |
| iCBI number | | 0.53 | NA | NA | NA | NA | NA | NA | 1.00 |

TABLE 5

Property Fata for Comparative Examples (Commerical Resins)

| Comparative First Compositions | Units | Comp. N4770 NORDEL IP 4770 DOW | Comp. R539 ROYALENE 539 Lion Copolymer | Comp. V5601 VISTALON 5601 ExxonMobil | Comp. KP281 KEP-281F Kumho | Comp. V7500 VISTALON 7500 ExxonMobil | Comp. K8550C KELTAN 8550C Lanxess | Comp. K8570C KELTAN 8570C Lanxess | Comp. VISTALON 6602 |
|---|---|---|---|---|---|---|---|---|---|
| wt % C2 | | 70 | 70.5 | 69 | 65 | 56 | 48 | 66 | 55 |
| wt % C3 | | 25.1 | 24.9 | 26.6 | 28.8 | 38.3 | 46.5 | 29 | 39.8 |
| wt % ENB | | 4.9 | 4.6 | 4.4 | 6.2 | 5.7 | 5.5 | 5.0 | 5.2 |
| ML (1 + 4) 125° C. | MU | 70 | 70 | 72 | 94 | 90 | 80 | 80 | 80 |
| Mn | g/mol | 59720 | 64890 | 53250 | 54320 | 60540 | 69436 | 77560 | 82940 |
| Mw | g/mol | 173336 | 196040 | 206330 | 232490 | 215640 | 221041 | 206230 | 219090 |
| Mz | g/mol | 388200 | 575530 | 612870 | 769980 | 625150 | 625206 | 500810 | 571600 |
| Mw/Mn | | 2.9 | 3.02 | 3.87 | 4.28 | 3.56 | 3.18 | 2.66 | 2.64 |
| V (0.1, 190 C.) | Pa · s | 115000 | 205000 | 302520 | 315000 | 289200 | 217000 | 197000 | 149000 |
| V (100, 190 C.) | Pa · s | 4498 | 4449 | 3772 | 3601 | 3600 | 3740 | 5076 | 3654 |
| V0.1/V100 | | 26 | 46 | 80 | 88 | 80 | 60 | 39 | 41 |
| TD (0.1, 190 C.) | | 1.36 | 0.78 | 0.74 | 0.58 | 0.66 | 0.71 | 0.85 | 1.16 |
| TD (100, 190 C.) | | 0.66 | 0.61 | 0.53 | 0.54 | 0.53 | 0.55 | 0.61 | 0.53 |
| 13C NMR % Peak Area 21.3-22.4 ppm | % | N/A | 0.9 | 0.2 | 0.8 | 1.1 | 1.7 | NA | NA |
| 13 C NMR % Peak 34.4 ppm-34.6 ppm | | N/A | ND | ND | ND | ND | ND | NA | NA |
| iCBI | | | ND | ND | ND | ND | ND | ND | ND |

ND = Not Detected (<0.010).

TABLE 6

Some Commercial Resins

| Comp. First Compositions (EPDM) | Mooney Viscosity @ 125 C., MU | Mw, g/mol | Mz, g/mol | Mw/ Mn | V0.1 rad/s, Pa · s | NMR % Peak Area 21.3-22.4 ppm | 13 C NMR % Peak 34.4-34.6 ppm | iCBI |
|---|---|---|---|---|---|---|---|---|
| NORDEL 5565 | 65.1 | 181131 | 394709 | 2.82 | 86735 | 3.0 | NA | NA |
| NORDEL N4820 | 18.6 | 86794 | 159220 | 2.40 | 13005 | NA | NA | NA |
| NORDEL N4725 | 25.4 | 112526 | 267563 | 3.18 | 28575 | 2.0 | NA | NA |
| NORDEL N4570 | 67.6 | 179700 | 362219 | 2.63 | 105000 | NA | NA | NA |
| NORDEL N4785 | 86.0 | 179582 | 340461 | 2.48 | 136000 | NA | NA | NA |
| NORDEL N3640 | 40.0 | 146450 | 318862 | 2.94 | 58843 | NA | NA | NA |
| NORDEL N3720 | 20.3 | 110226 | 295300 | 3.55 | 16606 | NA | NA | NA |
| NORDEL N3745 | 45.1 | 135655 | 266966 | 2.64 | 125000 | NA | NA | NA |

NA = Not Available.

TABLE 7

(peroxide cure system)

| Formulation | Comp. FA | Inv. F1 | Inv. F2 | Comp. FB | Comp. FC | Comp. FD | Comp. FE |
|---|---|---|---|---|---|---|---|
| NORDEL 4770 | 100.0 | | | | | | |
| First Composition Ex. 2 | | 100.0 | | | | | |
| First Composition Ex. 3 | | | 100.0 | | | | |
| VISTALON 5601 | | | | 100.0 | | | |
| KUMO KEP 281F | | | | | 100.0 | | |
| ROYALENE 539 | | | | | | 100.0 | |
| KELTAN 8570C | | | | | | | 100.0 |
| SUNPAR 2280 | 58.0 | 58.0 | 58.0 | 58.0 | 58.0 | 58.0 | 58.0 |
| OMYA 2T-FL (Calcium Carbonate) | 20.0 | 20.0 | 20.0 | 20.0 | 20.0 | 20.0 | 20.0 |
| Cabot Sterling SO (N-550 Carbon Black) | 80.0 | 80.0 | 80.0 | 80.0 | 80.0 | 80.0 | 80.0 |
| CARBOWAX PEG 3350 (PEG 3350) | 2.0 | 2.0 | 2.0 | 2.0 | 2.0 | 2.0 | 2.0 |
| Stearic Acid F-2000 | 1.5 | 1.5 | 1.5 | 1.5 | 1.5 | 1.5 | 1.5 |
| VANOX ZMTI | 2.0 | 2.0 | 2.0 | 2.0 | 2.0 | 2.0 | 2.0 |
| VANOX CDPA | 1.0 | 1.0 | 1.0 | 1.0 | 1.0 | 1.0 | 1.0 |
| VulCUP-40KE Peroxide | 8.0 | 8.0 | 8.0 | 18.0 | 8.0 | 8.0 | 8.0 |
| SARET SR 517 HPD | 6.0 | 6.0 | 6.0 | 6.0 | 6.0 | 6.0 | 6.0 |
| Total weight parts | 278.5 | 278.5 | 278.5 | 278.5 | 278.5 | 278.5 | 278.5 |

TABLE 8

(peroxide cure system)

| | Comp. FF | Inv. F3 | Inv. F4 | Comp. FG | Comp. FH | Comp. FJ |
|---|---|---|---|---|---|---|
| NORDEL 4770 | 100.0 | | | | | |
| First Composition Ex. 2 | | 100.0 | | | | |
| First Composition Ex. 3 | | | 100.0 | | | |
| VISTALON 5601 | | | | 100.0 | | |
| KUMO KEP 281F | | | | | 100.0 | |
| ROYALENE 539 | | | | | | 100.0 |
| SUNPAR 2280 | 65.0 | 65.0 | 65.0 | 65.0 | 65.0 | 65.0 |
| OMYA 2T-FL (Calcium Carbonate) | 20.0 | 20.0 | 20.0 | 20.0 | 20.0 | 20.0 |
| Cabot Sterling V (N-660 Carbon Black) | 80.0 | 80.0 | 80.0 | 80.0 | 80.0 | 80.0 |
| Cabot Sterling SO (N-550 Carbon Black) | | | | | | |
| CARBOWAX PEG 3350 (PEG 3350) | 2.0 | 2.0 | 2.0 | 2.0 | 2.0 | 2.0 |
| Stearic Acid F-2000 | 1.5 | 1.5 | 1.5 | 1.5 | 1.5 | 1.5 |
| VANOX ZMTI | 2.0 | 2.0 | 2.0 | 2.0 | 2.0 | 2.0 |
| VANOX CDPA | 1.0 | 1.0 | 1.0 | 1.0 | 1.0 | 1.0 |
| VULCUP-40KE Peroxide | 8.0 | 8.0 | 8.0 | 8.0 | 8.0 | 8.0 |
| SARET SR 517 HPD | 6.0 | 6.0 | 6.0 | 6.0 | 6.0 | 6.0 |
| Total parts | 285.5 | 285.5 | 285.5 | 285.5 | 285.5 | 285.5 |

TABLE 9

(sulfur cure system)

| | Comp. FK | Inv. F5 | Inv. F6 | Comp. FL | Comp. FM | Comp. FN | Comp. FO |
|---|---|---|---|---|---|---|---|
| Nordel 4770 | 100.0 | | | | | | |
| First Composition Ex. 2 | | 100.0 | | | | | |
| First Composition Ex. 3 | | | 100.0 | | | | |
| VISTALON 5601 | | | | 100.0 | | | |
| KUMO KEP 281F | | | | | 100.0 | | |
| ROYALENE 539 | | | | | | 100.0 | |
| KELTAN 8570C | | | | | | | 100.0 |
| SUNPAR 2280 | 150.0 | 150.0 | 150.0 | 150.0 | 150.0 | 150.0 | 150.0 |

TABLE 9-continued (sulfur cure system)

| | Comp. FK | Inv. F5 | Inv. F6 | Comp. FL | Comp. FM | Comp. FN | Comp. FO |
|---|---|---|---|---|---|---|---|
| OMYA 2T-FL (Calcium Carbonate) | 150.0 | 150.0 | 150.0 | 150.0 | 150.0 | 150.0 | 150.0 |
| Cabot Sterling SO (N-550 Carbon Black) | 160.0 | 160.0 | 160.0 | 160.0 | 160.0 | 160.0 | 160.0 |
| CARBOWAX PEG 3350 (PEG 3350) | 3.0 | 3.0 | 3.0 | 3.0 | 3.0 | 3.0 | 3.0 |
| DESICAL P, 80% (CaO) | 2.0 | 2.0 | 2.0 | 2.0 | 2.0 | 2.0 | 2.0 |
| Stearic Acid F-2000 | 1.0 | 1.0 | 1.0 | 1.0 | 1.0 | 1.0 | 1.0 |
| Zinc Oxide (Kadox 720 ZnO) | 5.0 | 5.0 | 5.0 | 5.0 | 5.0 | 5.0 | 5.0 |
| RUBBERMAKERS Sulfur (209) | 1.5 | 1.5 | 1.5 | 1.5 | 1.5 | 1.5 | 1.5 |
| Sulfenamide (CBS) | 1.5 | 1.5 | 1.5 | 1.5 | 1.5 | 1.5 | 1.5 |
| MBTS (Rhenogran MBTS-75) | | 1 | 1 | 1 | 1 | 1 | 1 |
| MBT (Rhenogran MBT-80) | 0.5 | 0.5 | 0.5 | 0.5 | 0.5 | 0.5 | 0.5 |
| ZDMC (Rhenogran ® ZDMC-80; Zinc Dimethyldithiocarbamate) | 1.8 | 1.8 | 1.8 | 1.8 | 1.8 | 1.8 | 1.8 |
| Total weight parts | 577.3 | 577.3 | 577.3 | 577.3 | 577.3 | 577.3 | 577.3 |

TABLE 10

(sulfur cure system)

| | Inv. F7 | Comp. FP | Comp. FQ |
|---|---|---|---|
| NORDEL IP 4570 | | 100.0 | |
| First Composition Ex. 4 | 100.0 | | |
| VISTALON 6602 | | | 100.0 |
| SUNPAR 2280 | 150.0 | 150.0 | 150.0 |
| OMYA 2T-FL (Calcium Carbonate) | 150.0 | 150.0 | 150.0 |
| Cabot Sterling V (N-660 Carbon Black) | 160.0 | 160.0 | 160.0 |
| CARBOWAX PEG 3350 (PEG 3350) | 2.0 | 2.0 | 2.0 |
| RUBBERMAKERS Sulfur (209) | 0.3 | 0.3 | 0.3 |
| Stearic Acid F-2000 | 1.5 | 1.5 | 1.5 |
| Zinc Oxide (Kadox 720 ZnO) | 5.0 | 5.0 | 5.0 |
| Total PPHR | 568.8 | 568.8 | 568.8 |
| ML 1 + 4 + 2 @ 100° C. | | | |
| ML(1 + 4) | 25.0 | 26.5 | 29.5 |
| ML(1 + 6) | 2 | 1.4 | 2.7 |
| slope | −0.355 | −0.441 | −0.315 |
| intercept | 8.7 | 9.1 | 9.9 |
| MLRA Area (MU * S) | 282.3 | 220.3 | 369.4 |

TABLE 11

| Formulation | FA | F1 | F2 | FB | FC | FD | FE |
|---|---|---|---|---|---|---|---|
| Total weight parts | 278.5 | 278.5 | 278.5 | 278.5 | 278.5 | 278.5 | 278.5 |
| | N4770 | First Comp. Ex. 2 | First Comp. Ex. 3 | VISTALON 5601 | KEP 281 | ROYALENE 539 | KELTAN 8570C |
| MDR 30 mins @160 C. | | | | | | | |
| ML | 1.59 | 1.77 | 1.61 | 1.79 | 1.77 | 1.61 | 1.77 |
| MH | 15.57 | 14.81 | 12.9 | 15.05 | 13.38 | 14.68 | 17.18 |
| ts1 | 1.11 | 1.1 | 1.19 | 1.1 | 1.2 | 1.14 | 1.06 |
| ts2 | 1.58 | 1.58 | 1.81 | 1.63 | 1.93 | 1.66 | 1.48 |
| t50 | 5.39 | 5.29 | 5.34 | 5.58 | 5.74 | 5.27 | 5.44 |
| t90 | 20.13 | 20.06 | 20.15 | 20.38 | 20.65 | 19.73 | 19.8 |
| MDR 30 mins @180 C. | 1.42 | 1.64 | 1.47 | 1.65 | 1.6 | 1.47 | 1.6 |
| ML | 18.04 | 16.92 | 14.98 | 17.49 | 15.73 | 17.05 | 18.96 |
| MH | 0.43 | 0.43 | 0.44 | 0.42 | 0.46 | 0.45 | 0.42 |
| ts1 | 0.54 | 0.55 | 0.58 | 0.55 | 0.62 | 0.58 | 0.52 |
| ts2 | 1.31 | 1.3 | 1.3 | 1.32 | 1.38 | 1.33 | 1.29 |
| t50 | 3.93 | 3.91 | 3.81 | 3.99 | 4.15 | 3.93 | 3.94 |

TABLE 12

| Formulation | FF | F3 | F4 | FG | FH | FJ |
|---|---|---|---|---|---|---|
| Total parts | 285.5 | 285.5 | 285.5 | 285.5 | 285.5 | 285.5 |
|  | N4770 | First Comp. Ex. 2 | First Comp. Ex. 3 | VISTALON 5601 | KEP 281 | ROYALENE 539 |
| MDR 30 mins @160 C. | | | | | | |
| ML | 1.22 | 1.4 | 1.36 | 1.37 | 1.35 | 1.29 |
| MH | 12.31 | 11.29 | 10.75 | 11.65 | 10.56 | 11.80 |
| ts1 | 1.3 | 1.31 | 1.34 | 1.33 | 1.45 | 1.37 |
| ts2 | 2.05 | 2.05 | 2.18 | 2.14 | 2.56 | 2.13 |
| t50 | 5.69 | 5.32 | 5.41 | 5.73 | 5.99 | 5.51 |
| t90 | 20.43 | 19.43 | 19.98 | 20.39 | 20.72 | 19.89 |
| MDR 30 mins @180 C. | | | | | | |
| ML | 1.08 | 1.29 | 1.23 | 1.26 | 1.22 | 1.15 |
| MH | 14.91 | 13.58 | 12.68 | 13.98 | 12.9 | 13.98 |
| ts1 | 0.48 | 0.49 | 0.5 | 0.5 | 0.53 | 0.5 |
| ts2 | 0.64 | 0.65 | 0.67 | 0.66 | 0.74 | 0.66 |
| t50 | 1.4 | 1.38 | 1.38 | 1.42 | 1.48 | 1.4 |
| t90 | 4.19 | 4 | 4.03 | 4.12 | 4.4 | 4.09 |

TABLE 13

| Formulation | FK | F5 | F6 | FL | FM | FN | FO |
|---|---|---|---|---|---|---|---|
| Total parts (wt) | 577.3 | 577.3 | 577.3 | 577.3 | 577.3 | 577.3 | 577.3 |
| Remark | N4770 | First Comp. Ex. 2 | First Comp. Ex. 3 | VISTALON 5601 | KEP 281 | ROYALENE 539 | KELTAN 8570C |
| MDR 30 mins @ 160 C. | | | | | | | |
| ML | 1.17 | 1.27 | 1.26 | 1.3 | 1.13 | 1.12 | 1.32 |
| MH | 11.39 | 10.07 | 10.28 | 11.39 | 8.8 | 8.86 | 11.61 |
| ts1 | 1.12 | 1.28 | 1.21 | 1.26 | 1.24 | 1.24 | 1.3 |
| ts2 | 1.41 | 1.6 | 1.52 | 1.58 | 1.55 | 1.55 | 1.62 |
| t50 | 2.51 | 2.53 | 2.46 | 2.67 | 2.06 | 2.13 | 2.61 |
| t90 | 19.39 | 15.97 | 16.3 | 17.64 | 11.22 | 12.42 | 18.51 |
| MDR 30 mins @180 C. | | | | | | | |
| ML | 1.09 | 1.2 | 1.2 | 1.23 | 1.05 | 1.03 | 1.23 |
| MH | 12.1 | 10.4 | 10.67 | 11.37 | 8.51 | 9.42 | 12.2 |
| ts1 | 0.52 | 0.57 | 0.52 | 0.55 | 0.56 | 0.56 | 0.57 |
| ts2 | 0.61 | 0.67 | 0.63 | 0.66 | 0.66 | 0.67 | 0.68 |
| t50 | 1.13 | 1.06 | 1.04 | 1.1 | 0.84 | 0.91 | 1.12 |
| t90 | 12.94 | 10.59 | 10.83 | 11.25 | 6.7 | 13.53 | 14.3 |

TABLE 14

| | | | Formulation | | |
|---|---|---|---|---|---|
| | | | F77 | FPP Masterbatch* | FQQ |
| | | | F7 First Comp Ex. 4 | FP NORDEL IP 4570 | FQ VISTALON 6602 |
| weight parts of Masterbatch* | | | 568.80 | 568.80 | 568.80 |
| Total weight parts (Masterbatch plus additives below) | | | 575.10 | 575.10 | 575.10 |
| Rubbermakers Sulfur (209) | | | 1.50 | 1.50 | 1.50 |
| Sulfenamide (CBS) | | | 1.50 | 1.50 | 1.50 |
| MBTS (Rhenogran MBTS-75) | | | 1.00 | 1.00 | 1.00 |
| MBT (Rhenogran ® MBT-80) | | | 0.50 | 0.50 | 0.50 |
| ZDMC (Rhenogran ® ZDMC-80; Zinc Dimethyldithiocarbamate) | | | 1.80 | 1.80 | 1.80 |
| MDR @ 180° C. and 30 mins | ts1 | min | 0.74 | 0.63 | 0.65 |
| | ts2 | min | 0.90 | 0.76 | 0.78 |
| | t10 | min | 0.68 | 0.62 | 0.63 |
| | t50 | min | 1.15 | 1.09 | 1.08 |
| | t90 | min | 5.11 | 11.95 | 9.94 |
| | ML | dNm | 0.85 | 0.84 | 0.94 |
| | MH | dNm | 8 | 10.2 | 10.02 |
| MDR @ 160° C. and 30 mins | ts1 | min | 1.76 | 1.41 | 1.47 |
| | ts2 | min | 2.22 | 1.76 | 1.84 |
| | t10 | min | 1.61 | 1.4 | 1.44 |
| | t50 | min | 2.99 | 2.83 | 2.83 |
| | t90 | min | 12.73 | 19.82 | 19.72 |

TABLE 15

| Formulation | | FA | F1 | F2 | FB | FC | FD | FE |
|---|---|---|---|---|---|---|---|---|
| Total parts wt | | 278.5 | 278.5 | 278.5 | 278.5 | 278.5 | 278.5 | 278.5 |
| Remark | | N4770 | First Comp. Ex. 2 | First Comp. Ex. 3 | VISTALON 5601 | KEP 281 | ROYALENE 539 | KELTAN 8570C |
| Tensile Micro SI Units | | | | | | | | |
| 10% Mod | MPa | 0.98 | 0.91 | 0.4 | 0.55 | 0.48 | 0.79 | 0.6 |
| 20% Mod | MPa | 1.58 | 1.52 | 0.76 | 0.93 | 0.88 | 1.31 | 1.04 |
| 50% Mod | MPa | 2.4 | 2.4 | 1.3 | 1.6 | 1.6 | 2.1 | 1.8 |
| 100% Mod | MPa | 3.8 | 3.6 | 2.1 | 2.6 | 2.8 | 3.5 | 3.2 |
| 200% Mod | MPa | 7.03 | 6.69 | 4.45 | 5.44 | 5.78 | 6.59 | 6.57 |
| 300% Mod | MPa | 10.17 | 9.52 | 6.98 | 8.25 | 9.06 | 9.82 | 10.04 |
| 400% Mod | MPa | 13.54 | 12.51 | 9.67 | 11.38 | 12.84 | 13.33 | 13.8 |
| Tensile@Brk | MPa | 14 | 14 | 12 | 13 | 13 | 14 | 15 |
| % Elg@UT | % | 436 | 478 | 481 | 445 | 401 | 428 | 430 |
| Shore A | | 76 | 76 | 65 | 66 | 68 | 73 | 71 |
| CS Mean @ RT, 70 hrs | [%] | 26 | 27 | 13 | 12 | 9 | 21 | 17 |
| CS Mean @ 70 C., 70 hrs | [%] | 13 | 15 | 12 | 12 | 13 | 13 | 9 |
| CS Mean @ 150 C., 70 hrs | [%] | 15 | 15 | 14 | 14 | 13 | 14 | 13 |

TABLE 16

| | | FF | F3 | F4 | FG | FH | FJ |
|---|---|---|---|---|---|---|---|
| | | N4770 | First Comp. Ex. 2 | First Comp. Ex. 3 | VISTALON 5601 | KEP 281 | ROYALENE 539 |
| Stress @ Break | MPa | 14.6 | 12.8 | 11.8 | 12.3 | 13.3 | 14.6 |
| Strain At Brk | % | 357.2 | 343.5 | 325.7 | 321.5 | 270.8 | 347.3 |
| 50% Mod | MPa | 3.7 | 3.3 | 3.4 | 3.6 | 4.3 | 3.9 |
| 100% Mod | MPa | 5.3 | 4.8 | 4.8 | 5.0 | 6.0 | 5.5 |
| 200% Mod | MPa | 8.7 | 7.9 | 7.5 | 7.9 | 10.4 | 9.1 |
| ShoreA Hardness | AVG. | 71.2 | 69.1 | 57.2 | 59.2 | 60.7 | 66.6 |
| CS Mean @ RT for 70 hrs | [%] | 40 | 42 | 15 | 13 | 16 | 34 |
| CS Mean @ 70 C. for 70 hrs | [%] | 13 | 16 | 11 | 12 | 12 | 14 |
| CS Mean @ 150 C. for 70 hrs | [%] | 16 | 17 | 17 | 17 | 15 | 16 |

TABLE 17

| | | FK | F5 | F6 | FL | FM | FN | FO |
|---|---|---|---|---|---|---|---|---|
| Part Loading | | 577.3 N4770 | 577.3 First Comp. Ex. 2 | 577.3 First Comp. Ex. 3 | 577.3 VISTALON 5601 | 577.3 KEP 281 | 577.3 ROYALENE 539 | 577.3 KELTAN 8570C |
| Tensile Micro SI Units @ RT | | | | | | | | |
| 20% Mod | [MPa] | 1.18 | 1.08 | 0.77 | 0.79 | 0.81 | 0.97 | 0.93 |
| 50% Mod | [MPa] | 1.85 | 1.67 | 1.27 | 1.31 | 1.42 | 1.6 | 1.52 |
| 100% Mod | [MPa] | 2.84 | 2.53 | 2.04 | 2.11 | 2.39 | 2.59 | 2.48 |
| 200% Mod | [MPa] | 4.56 | 4.12 | 3.57 | 3.73 | 4.2 | 4.42 | 4.29 |
| 300% Mod | [MPa] | 5.85 | 5.34 | 4.72 | 5 | 5.82 | 5.95 | 5.7 |
| 400% Mod | [MPa] | 7.11 | 6.48 | 5.82 | 6.28 | 7.28 | 7.33 | 7.22 |
| Tensile@Brk | [MPa] | 7.3 | 7.3 | 6.9 | 7.3 | 7.4 | 7.5 | 7.4 |
| % Elg@UT | [%] | 433 | 504 | 508 | 490 | 415 | 415 | 421 |
| Shore A: | | 74 | 71 | 62 | 65 | 66 | 69 | 67 |
| CS Mean @ RT for 70 hrs | [%] | 31 | 36 | 17 | 20 | 18 | 21 | 23 |
| CS Mean @ 70 C. for 70 hrs | [%] | 18 | 20 | 18 | 21 | 18 | 14 | 13 |
| CS Mean @ 150 C. for 70 hrs | [%] | 70 | 71 | 71 | 78 | 75 | 70 | 71 |

TABLE 18

| | | F77 | FPP Masterbatch | FQQ |
|---|---|---|---|---|
| | | F7 First Comp. Ex. 4 | FP NORDEL IP 4570 | FQ VISTALON 6602 |
| Total Parts wt (sum weight of Masterbatch plus additives below) | | 575.10 | 575.10 | 575.10 |
| Total PHR of Masterbatch | | 568.80 | 568.80 | 568.80 |
| Tensile Micro SI Units | | | | |
| 10% Mod | [MPa] | 0.35 | 0.39 | 0.39 |
| 20% Mod | [MPa] | 0.56 | 0.6 | 0.6 |
| 50% Mod | [MPa] | 0.9 | 0.98 | 0.97 |
| 100% Mod | [MPa] | 1.43 | 1.58 | 1.54 |
| 200% Mod | [MPa] | 2.81 | 3.05 | 2.99 |
| 300% Mod | [MPa] | 4.04 | 4.31 | 4.27 |
| 400% Mod | [MPa] | 5.04 | 5.39 | 5.34 |
| Tensile@Brk | [MPa] | 6.5 | 5.77 | 6.83 |
| % Elg@UT | [%] | 541.4 | 436.3 | 526.2 |
| Hardness AVG. | | 54.5 | 56.4 | 59.0 |
| CS Mean 22.0 hour/70° C. | [%] | 11 | 13 | 11 |
| CS Mean 22.0 hour/23° C. | [%] | 13 | 10 | 11 |

Summary of Results

The inventive formulations have a faster mixing cycle and high green strength. Especially the hot green strength of the formulations are high due to a combination of the broad molecular distribution, high molecular weight, and high tan delta of the polymer. Surprisingly, the inventive formulations have high green strength, despite having high tan delta values and low V0.1. High tan delta, values greater than 1.0, indicate a higher viscous response than its elastic response, and high V0.1 values are generally associated with high viscosity (either from branching and molecular weight). For Mooney viscosity polymers (around 70 MV), the inventive formulations at various filler loadings have significantly higher S' (200%) values than the comparative examples FA, FF, and FK and FD, FJ, FN, and a similar S' (200%) to FB, FG, FL. It is believed that the high green strength of the inventive formulations is due to the combination of broad molecular weight distribution, high molecular weight, and high tan delta of the polymer. Even more surprising, the inventive formulations, when compared comparative formulations FC, FH, FM and FO, FE; containing 90 Mooney viscosity (KEP-281F) and 80 Mooney viscosity (K8570C), polymers respectively, have comparable S' (200%). This is unexpected, since the polymer Mooney viscosity of the inventive examples is lower. The significance and utility of the inventive polymers that give comparable performance to higher Mooney viscosity polymers (70 versus 80 MV) has benefits for more consistent processing and extrusion and improved dimensional stability, resulting in better collapse resistance and shape retention of formed articles.

The rest of the compound properties, i.e., cure rate, and other cure properties, are also good. Broader MWD distribution also helped improve the tensile properties, with higher elongation at break, therefore higher tensile strength at break. The viscosity and rheological features provide a unique viscosity and component compatibility that results in better dispersion of the components of the formulation, such as carbon black, oils, curatives, talc, calcium carbonate, and other additives. Benefits are expected in the rubber mixing operations and in the processing of final articles, such as extruded profiles, injection molded articles, rolled and calendared articles.

What is claimed is:

1. A composition comprising a first composition, comprising a first ethylene/alpha-olefin/non-conjugated polyene and a second ethylene ethylene/alpha-olefin/non-conjugated polyene, and wherein the first composition comprises the following property: Mw>1389.6 [g/mole] MV+115,000 g/mole, wherein MV is the Mooney Viscosity (ML 1+4, 125° C.), and Mw is the weight average molecular weight, as determined by conventional GPC wherein the first composition further comprises the following property: V0.1<0.5464 [(Pa·s)(mole/g) Mz−155,000 Pa·s], wherein V0.1 is the melt viscosity (0.1 rad/s, 190° C.), and Mz is the z average molecular weight, as determined by conventional GPC.

2. The composition of claim 1, wherein the first composition further comprises the following property: Mw≥1389.6 [g/mole] MV+140,000 g/mole, wherein MV is the Mooney Viscosity (ML 1+4, 125° C.), and Mw is the weight average molecular weight, as determined by conventional GPC.

3. The composition of claim 1, wherein the first composition further comprises the following property: V0.1≤0.5464 [(Pa·s)(mole/g) Mz−200,000 Pa·s], wherein V0.1 is the melt viscosity (0.1 rad/s, 190° C.), and Mz is the z average molecular weight, as determined by conventional GPC.

4. The composition of claim 1, wherein first composition has a "13C NMR % iCB Peak Area," which is the {[(13C NMR peak area from 34.4 ppm to 34.6 ppm) divided by (the 13C NMR sum integral area from 0.00 ppm to 60.0 ppm and from 160.0 ppm to 100.0 ppm)]×100}, that is >0.010%, as determined by 13C NMR.

5. The composition of claim 1, wherein the first composition has a MWD from 2.80 to 6.80.

6. The composition of claim 1, wherein the first composition has a rheology ratio (V0.1/V100 at 190° C.) from 20 to 60.

7. The composition of claim 1, wherein the first ethylene/alpha-olefin/non-conjugated polyene is an EPDM, and the second ethylene ethylene/alpha-olefin-/non-conjugated polyene is an EPDM.

8. The composition of claim 1, wherein the first composition has a density from 0.850 to 0.890 g/cc.

9. An article comprising at least one component formed from the composition of claim 1.

* * * * *